United States Patent [19]

Lee

[11] Patent Number: 5,687,328
[45] Date of Patent: Nov. 11, 1997

[54] METHOD AND APPARATUS FOR ALIGNING DATA FOR TRANSFER BETWEEN A SOURCE MEMORY AND A DESTINATION MEMORY OVER A MULTIBIT BUS

[75] Inventor: Johnny Chuang-Li Lee, Santa Clara, Calif.

[73] Assignee: National Semiconductor Corporation, Santa Clara, Calif.

[21] Appl. No.: 442,551

[22] Filed: May 16, 1995

[51] Int. Cl.[6] .............................. G06F 12/00; G06F 13/00
[52] U.S. Cl. ............................ 395/306; 395/411; 395/311
[58] Field of Search ............................... 395/307, 411, 395/412, 306, 311

[56] References Cited

U.S. PATENT DOCUMENTS

| | | | |
|---|---|---|---|
| 3,602,896 | 8/1971 | Zeheb | 395/411 |
| 3,916,388 | 10/1975 | Shimp et al. | 395/800 |
| 4,131,940 | 12/1978 | Moyer | 395/250 |
| 4,507,731 | 3/1985 | Morrison | 395/411 |
| 5,168,561 | 12/1992 | Vo | 395/800 |
| 5,170,477 | 12/1992 | Potter et al. | 395/411 |
| 5,517,627 | 5/1996 | Pertersen | 395/311 |
| 5,524,265 | 6/1996 | Balmer et al. | 395/800 |

*Primary Examiner*—Jack B. Harvey
*Assistant Examiner*—Sumati Lefkowitz
*Attorney, Agent, or Firm*—Skjerven, Morrill, MacPherson, Franklin & Friel; David E. Steuber

[57] ABSTRACT

A data alignment logic cell properly aligns the individual data units (e.g., bytes) in a block of data that is transferred in a multiple bit bus such that the data units in the block are transferred to desired lanes of the bus. The data alignment logic cell includes a gathering unit, which aligns the data units into a fixed, justified arrangement in the bus, and a scattering unit, which receives the data units from the gathering unit and realigns them to the desired lanes. Both the gathering and scattering units contain registers for temporarily storing certain of the data units and multiplexers for transferring the data units between the lanes of the bus, the state of the multiplexers being determined by signals from control units.

11 Claims, 7 Drawing Sheets

5,687,328

METHOD AND APPARATUS FOR ALIGNING DATA FOR TRANSFER BETWEEN A SOURCE MEMORY AND A DESTINATION MEMORY OVER A MULTIBIT BUS

FIELD OF THE INVENTION

This invention relates to the transfer of blocks of data through a multiple lane bus and, in particular, to a logic cell which properly aligns the transferred data.

BACKGROUND OF THE INVENTION

Blocks of data are normally transferred between a source and a destination through an interconnecting bus. If the width of the bus is greater than the units in which the data are organized, the data must normally be realigned on the bus, i.e., a unit of data (e.g., a byte) which enters the bus in lane A may need to exit the bus in lane B, where each "lane" represents a channel which is capable of transferring a single unit of data (byte).

Transfers of data from a source memory to a destination memory, for example, are often accomplished by specifying a starting source address, a starting destination address, and the number of bytes to be transferred. The computer then causes the data to be read out of the source memory, beginning with the starting address, and delivered over a bus to the destination memory.

Since the starting source address is not generally in a lane (or column) in the source memory which is in same as the lane (or column) of the starting destination address in the destination memory, typically the data must be realigned in conjunction with the transfer. Therefore the first byte in the block of data to be transferred must be shifted from one lane to another.

Data alignment is also necessary, for example, in a block data transfer from a main computer to a graphics memory card through the interface bus, and from a computer to a sound card.

This problem is illustrated in FIG. 1. A block of data including twelve bytes, designated 0 to 11 respectively, is to be transferred from a source, represented by a memory M1, to a destination, represented by a memory M2, over a bus W. Memory M1 is a 4X memory which has lanes A, B, C and D, and memory M2 is likewise a 4X memory with lanes a, b, c and d. The addresses of the memory locations in lanes A and a are shown, in hexadecimal units, beneath memories M1 and M2.

In this example, the starting address of the data in memory M1 is 0009h and the starting destination address in memory M2 is 0007h. This means that byte 0 must be shifted from lane B in memory M1 to lane d in memory M2. Similarly, byte 1 must be shifted from lane C to lane a; byte 2 must be shifted from lane D to lane b; and byte 3 must be shifted from lane A to lane C.

Since each vertical row is shifted out of memory M1 at the same time, there is an additional problem with timing. Bytes 0, 1 and 2 are shifted out of memory M1 simultaneously but byte 0 must be shifted into memory M2 before bytes 1 and 2. Bytes 3 and 4 are shifted out of memory M1 after bytes 1 and 2, but all four of these bytes must be shifted into memory M2 simultaneously.

In the example shown in FIG. 1, the starting source address may be in any one of the four lanes A–D and the starting destination address may be in any one of the four lanes a–d. Accordingly, there are sixteen different possibilities including four in which the data are not shifted into different lanes.

What is needed is a simple, straightforward cell that can perform data alignment rapidly and accurately.

SUMMARY OF THE INVENTION

The data alignment logic cell of this invention is connected in a multiple lane data transfer bus and includes a data gathering unit and a data scattering unit. Data units to be transferred are initially shifted into the data gathering unit where they are arranged in a single row (justified) on the bus, with the first data unit always being transferred to a first lane of the bus, the second data unit always being transferred to a second lane of the bus, etc. The data gathering unit contains registers for temporarily storing certain of the data units in order to line them up on the bus, and multiplexers for transferring the data units between lanes of the bus.

Next the data units are shifted into a data scattering unit where they are realigned as required. Like the data gathering unit, the data scattering unit contains registers for temporarily storing certain of the data units, and multiplexers for transferring the data units between lanes of the bus.

The data gathering unit is driven by a first control unit which delivers a control word determined by the bus lane in which the first unit of data appears. The data scattering unit is driven by a second control unit which delivers a control word determined by the lane to which the first unit of data is to be transferred. In the preferred embodiment, the data gathering unit and the data scattering unit have the same structure.

A data alignment logic cell of this invention may be used in conjunction with buses which have a number of lanes equal to a power of two (2, 4, 8, 16, 32, etc.), wherein each lane is capable of transmitting a single data unit (byte, etc.). For a bus having N lanes, for example, the data gathering unit and data scattering unit each contain N multiplexers and N–1 registers. Each register holds a single data unit, and each multiplexer has N inputs. In the preferred embodiment, the output of one of the registers is connected to the inputs of N–1 multiplexers; the output of a second register is connected to the inputs of N–2 multiplexers; and so on, with the output of the last (N–1)th register being connected to the input of a single multiplexer.

The control unit for each unit controls the states of the multiplexers within the unit. The control word remains constant during the transfer of the data block.

While the embodiment described below aligns data that is organized into 8-bit data units (bytes), this invention is applicable to data which is organized into units of any size, e.g., single-bit, 4-bits (nibble), or 16-bits (word). The term "data unit" as used herein refers to data units having any number of bits.

DESCRIPTION OF THE INVENTION

Figure 1:
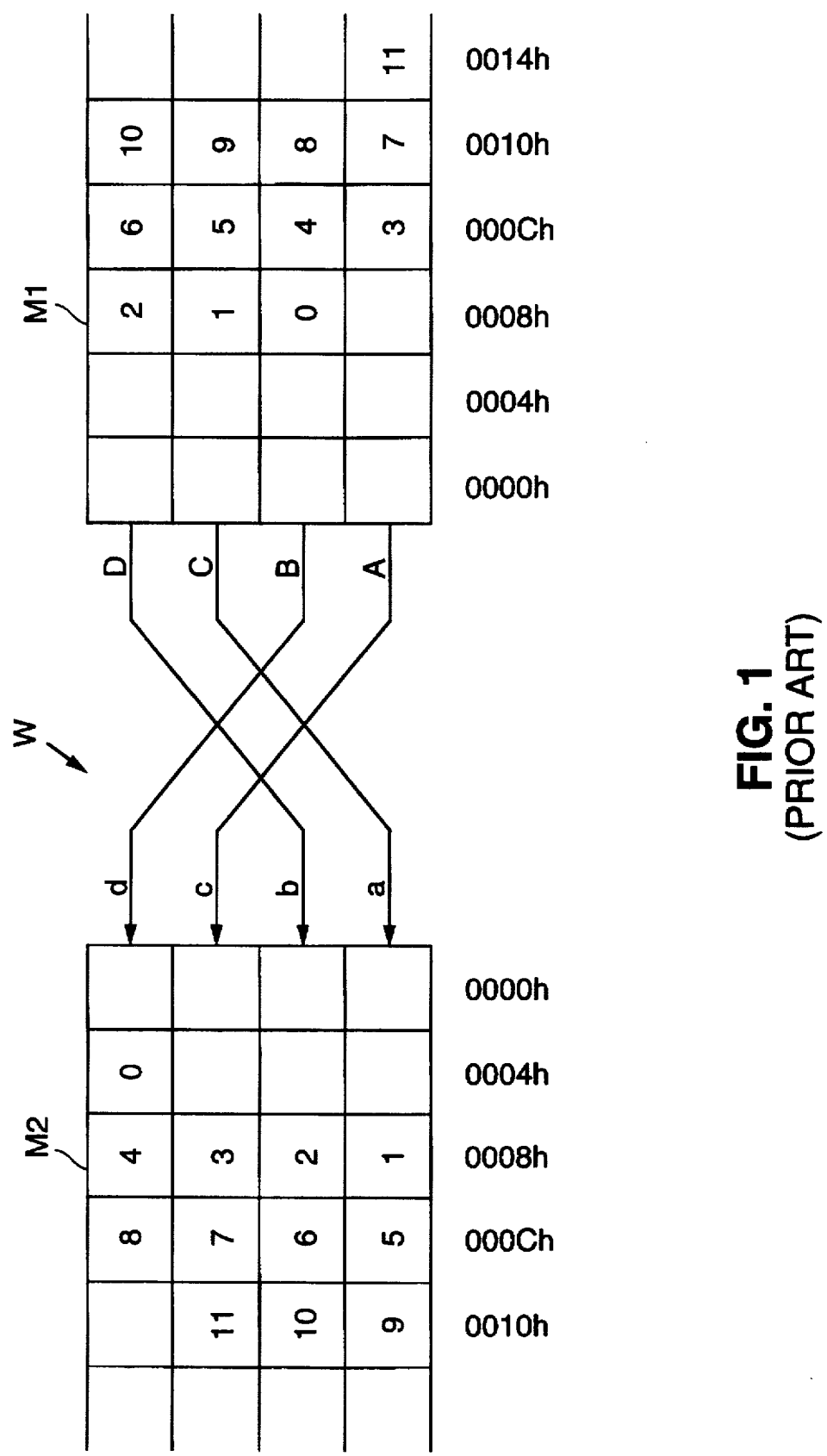
FIG. 1 illustrates the problem of aligning the data units when a block of data is transferred between a source and a destination.
Figure 2A:
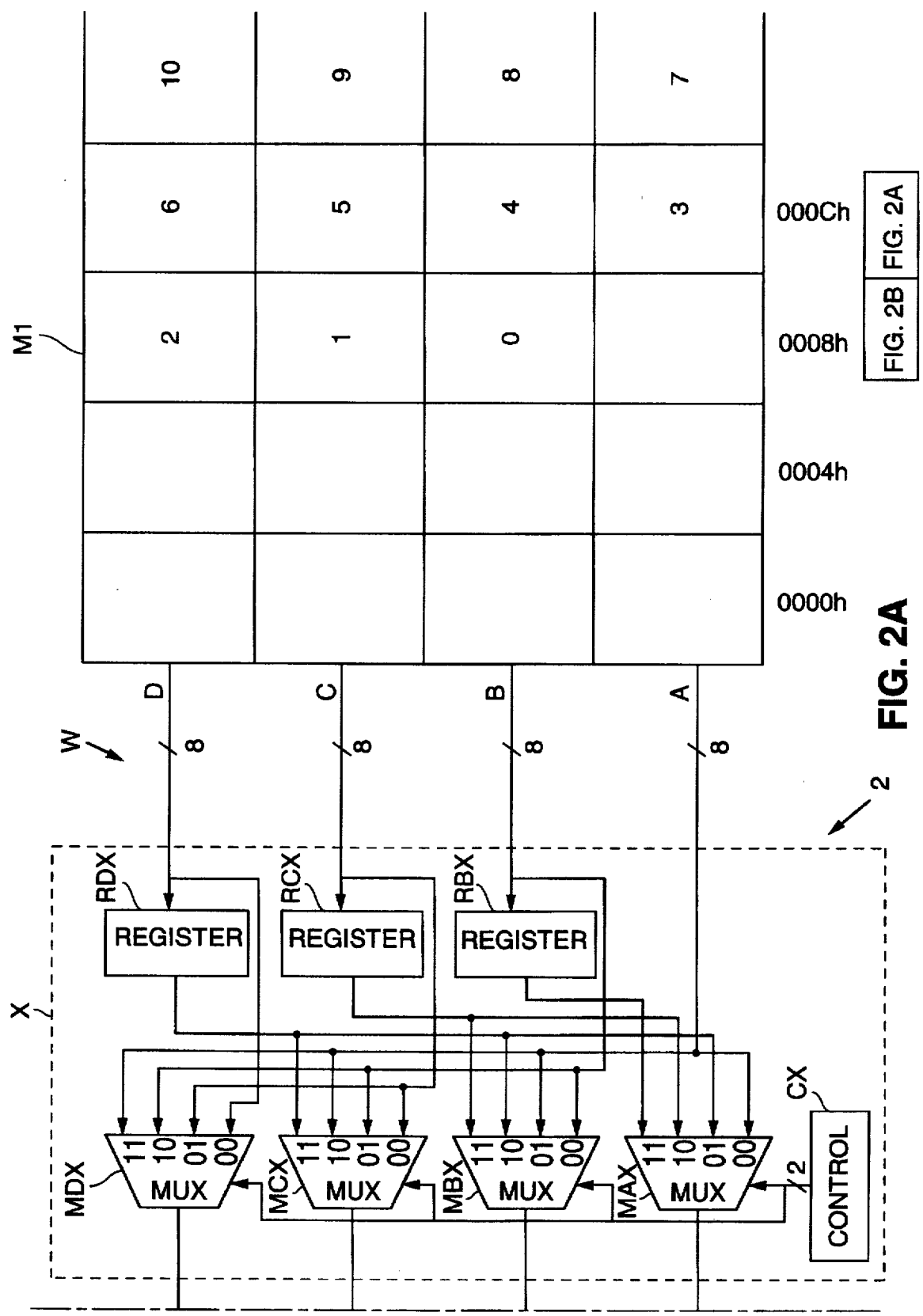
FIGS. 2A and 2B illustrate a schematic diagram showing a byte alignment cell containing a byte gathering unit and a byte scattering unit interconnected in a 32-bit (4 byte) bus between a source memory and a destination memory.
Figure 2B:
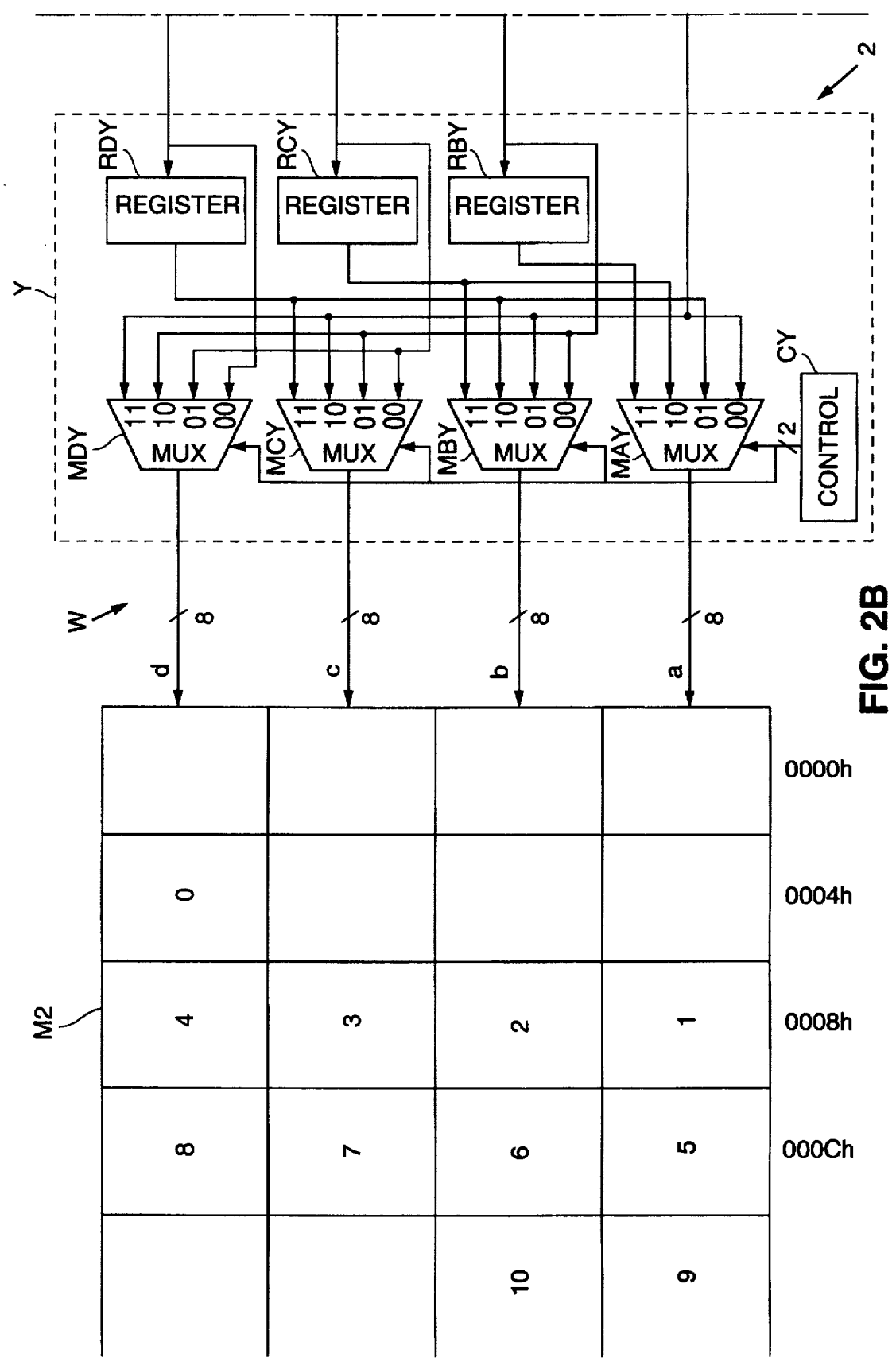

FIGS. 2A and 2B illustrate an embodiment of this invention which is used to align byte-sized data units. A byte alignment cell 2 includes a byte gathering unit X and a byte scattering unit Y. Byte alignment cell 2 is connected between a memories M1 and M2 via a bus W, shown in FIG. 1. As indicated above, any type of source and destination data storage units could be substituted for memories M1 and M2.

Byte gathering unit X and byte scattering unit Y each contain three registers, four multiplexers and a control in the preferred embodiment. Gathering unit X and scattering unit Y are identical except for the controls.

Referring initially to byte gathering unit X, each of registers RBX, RCX and RDX holds a byte (8-bits) of data. Register RBX is connected to the B lane of memory M1, and registers RCX and RDX are connected to the C and D lanes, respectively, of memory M1. Outputs of registers RBX-RDX are connected to inputs of multiplexers MAX, MBX, MCX and MDX as shown. In addition, lanes A-D of memory M1 are connected directly to certain of the inputs of multiplexers MAX-MDX. Each of multiplexers MAX-MDX has four inputs and one output. Control CX delivers a 2-bit word which selects one of the inputs of multiplexers MAX-MDX, respectively, and causes it to be delivered at the output of the multiplexer.

As noted above, the registers and multiplexers in bit scattering unit Y are identical to and are interconnected with each other in the same manner as the registers and multiplexers in bit gathering unit X. Thus registers RBY-RDY correspond to registers RBX-RDX and multiplexers MAY-MDY correspond to multiplexers MAX-MDX. Outputs of registers RBY-RDY are connected to inputs of multiplexers MAY-MDY in the same manner.

Byte gathering unit X and byte scattering unit Y are connected in a series arrangement such that the outputs of byte gathering unit X are connected to the inputs of byte scattering unit Y. Thus the outputs of multiplexers MBX-MDX are connected to the inputs of registers RBY-RDY, and the output of multiplexer MAX is connected directly to selected inputs of multiplexers MAY-MDY. The outputs of registers RBY-RDY are connected to selected inputs of multiplexers MAY-MDY.

Control CY delivers a 2-bit output which selects one of the inputs of multiplexers MAY-MDY. The outputs of multiplexers MAY-MDY form the outputs of byte scattering unit Y and are connected to lanes a-d, respectively, of memory M2.

The operation of byte alignment cell 2 will be described with reference to the data transfer illustrated in FIG. 1. As is customary, a system clock (not shown) provides synchronous pulses which clock data out of memory M1 and into memory M2. A vertical row of data (32 bits) is clocked out of or into a memory simultaneously.

Referring again to FIG. 2A, control CX delivers the control bits "11" to the control inputs of multiplexers MAX-MDX, and control CY delivers the control bits "11" to the control inputs of multiplexers MAY-MDY. In the first cycle of the clock pulse, bytes 0, 1 and 2 are clocked into registers RBX, RCX and RDX, respectively. In the second clock cycle, byte 3 will be clocked out of memory M1 and bytes 0-2 will be clocked out of registers RBX-RDX, simultaneously. Since the "11" inputs of multiplexers MAX-MDX are selected, byte 3 appears at the output of multiplexer MDX and bytes 0, 1 and 2 appear at the outputs of multiplexers MAX, MBX and MCX, respectively. During the second clock cycle, bytes 4-6 are also clocked into registers RBX-RDX.

Thus, after two clock cycles, bytes 0-3 have been delivered in a justified form at the outputs of bit gathering unit X. In a similar manner, after the third clock cycle bytes 4-7 appear in justified form at the outputs of byte gathering unit X.

In this situation, byte 0 is to be written into address 0007h of memory M2 and bytes 1, 2 and 3 are to be written into addresses 0008h, 0009h and 000Ah of memory M2. With the "11" inputs of multiplexers MAY-MDY selected, byte 0 (at the output of multiplexer MAX) is passed immediately through multiplexer MDY and into lane d of memory M2. Bytes 1-3 (at the outputs of multiplexers MBX-MDX) are read into registers RBY-RDY. Thus, after two clock cycles, byte 0 resides in address 0007h of memory M2 and bytes 1, 2 and 3 reside in registers RBY, RCY and RDY, respectively.

In the third clock cycle, with the "11" inputs of multiplexers MAY-MDY selected, bytes 1-3 are read out of registers RBY-RDY and into addresses 0008h, 0009h and 000Ah of memory M2. Byte 4, which was in register RBX at the end of the second clock cycle, is transferred through multiplexers MAX and MDY to address 00Bh of memory M2. Also, during the third clock cycle, bytes 5 and 6 are read out of registers RCX and RDX and into registers RBY and RCY. Byte 7 passes directly from memory M1 through multiplexer MDX and is read into register RDY. Thus, at the beginning of the fourth clock cycle, registers RBY-RDY hold bytes 5-7 respectively. Bytes 5-7 are written into memory locations 00Ch, 00Dh and 00Eh of memory M2, and byte 8 is read directly from register RBX through multiplexers MAX and MDY into address 000Fh of memory M2.

This process continues until the entire data block is transferred from memory M1 to memory M2, with bytes in lane A being switched to lane c, bytes in lane B being switched to lane d, bytes in lane C being switched to lane a, and bytes in lane D being switched to lane b.

As noted above, for this data transfer, controls CX and CY both delivered the control word "11" Tables A and B show the outputs of controls CX and CY for all possible data transfers, depending on the lane location of the first byte to be transferred.

TABLE A

| Starting Source Address | Output of Control CX |
|---|---|
| Lane A | 00 |
| Lane B | 11 |
| Lane C | 10 |
| Lane D | 01 |

TABLE B

| Starting Destination Address | Output of Control CY |
|---|---|
| Lane a | 00 |
| Lane b | 01 |
| Lane c | 10 |
| Lane d | 11 |

The output of control CY is simply the two least significant bits of the first destination address, while to obtain the output of control CX, the two least significant bits of the source address go through a mapping function in accordance with Table C.

TABLE C

| Least Significant Bits Of Source Address | Output of Control CX |
|---|---|
| 00 | 00 |
| 01 | 11 |
| 10 | 10 |
| 11 | 01 |

Figure 3:
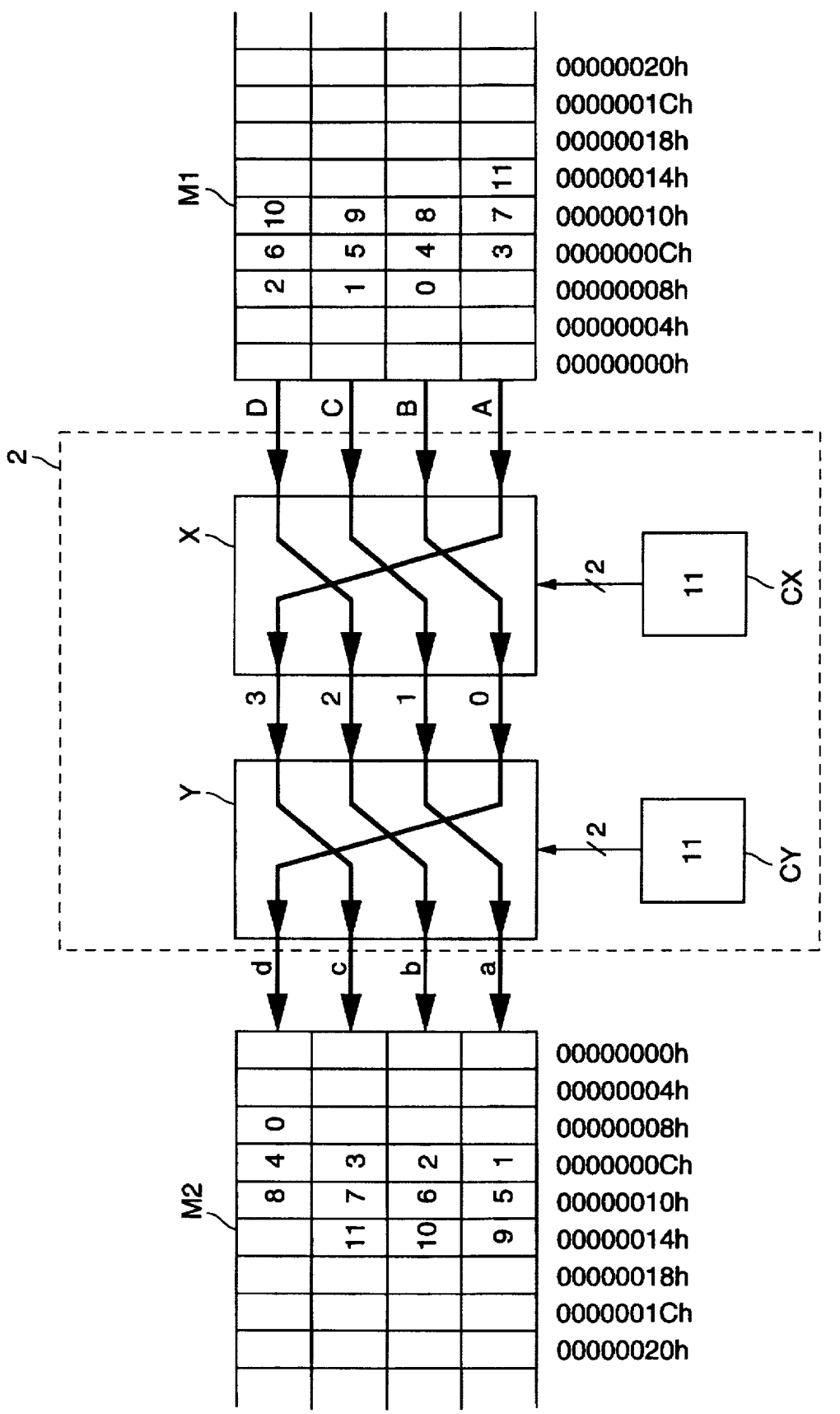
FIG. 3 illustrates conceptually the byte paths from the source memory to the destination memory for the data transfer shown in FIGS. 1, 2A and 2B.
Figure 4:
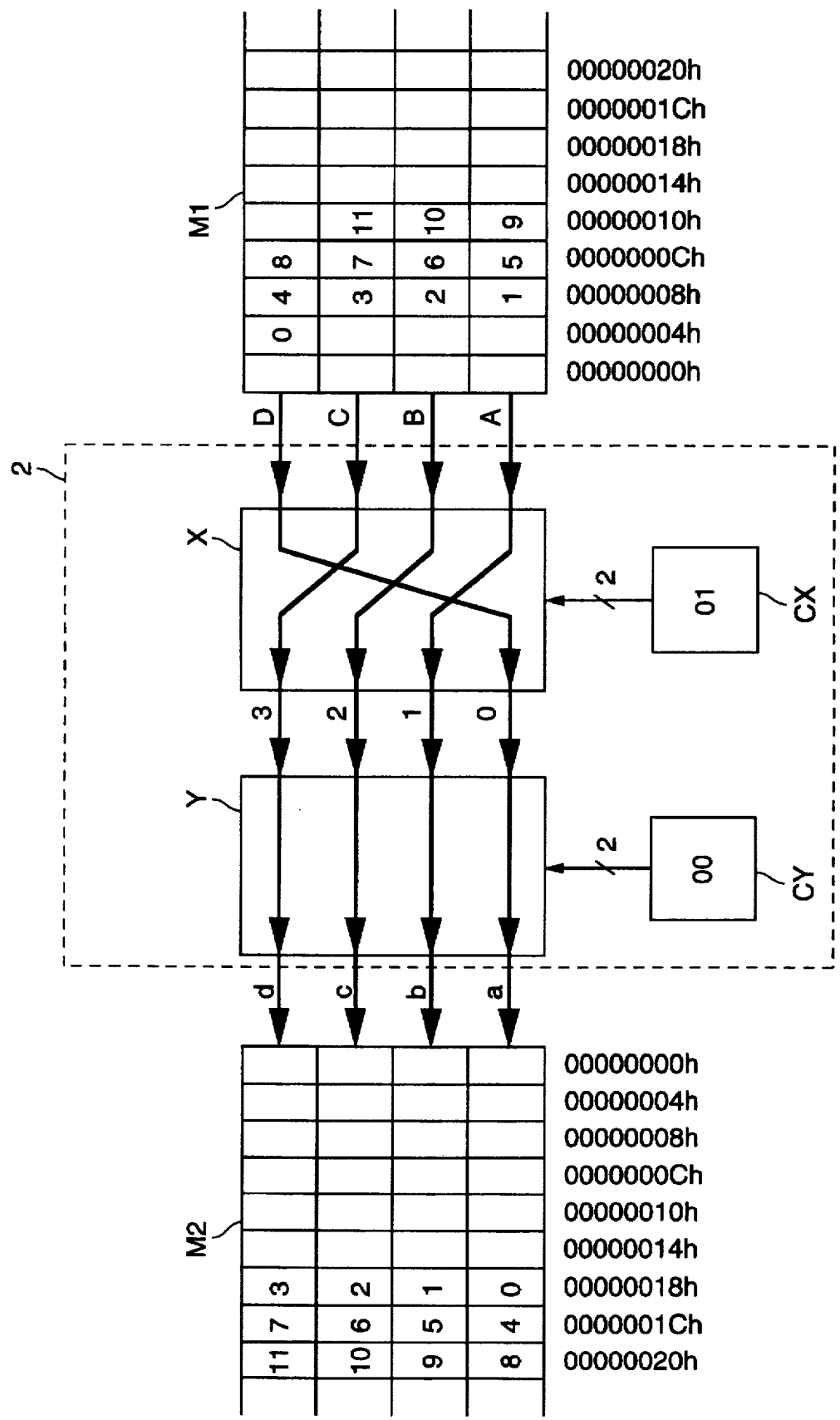
FIG. 4 illustrates conceptually the byte paths from the source memory to the destination memory for another example of a data transfer.

FIG. 3 illustrates conceptually the byte paths in the data transfer shown in FIGS. 1, 2A and 2B. FIG. 4 illustrates conceptually the byte paths in an alternative data transfer, with the starting source address being in lane D and the starting destination address being in lane a. In the data transfer shown in FIG. 4, control CX outputs a "01" and control CY outputs a "00". Note further that in both FIGS. 3 and 4 the bytes are "gathered" into a justified form by gathering unit X and then "scattered" by scattering unit Y.

The principles of this invention are applicable to buses having widths other than 32-bits, as shown in FIGS. 1–4. For example, embodiments according to this invention may involve buses having a width of 64-bits, 128-bits or any other width so long as the total bit width is divided into a number of lanes equal to a power of 2. For example, for a 64-bit bus, each byte gathering/scattering unit will have eight 8-to-1 multiplexers and seven 8-bit registers. The multiplexers will be controlled by 3-bit words.

Figure 5:
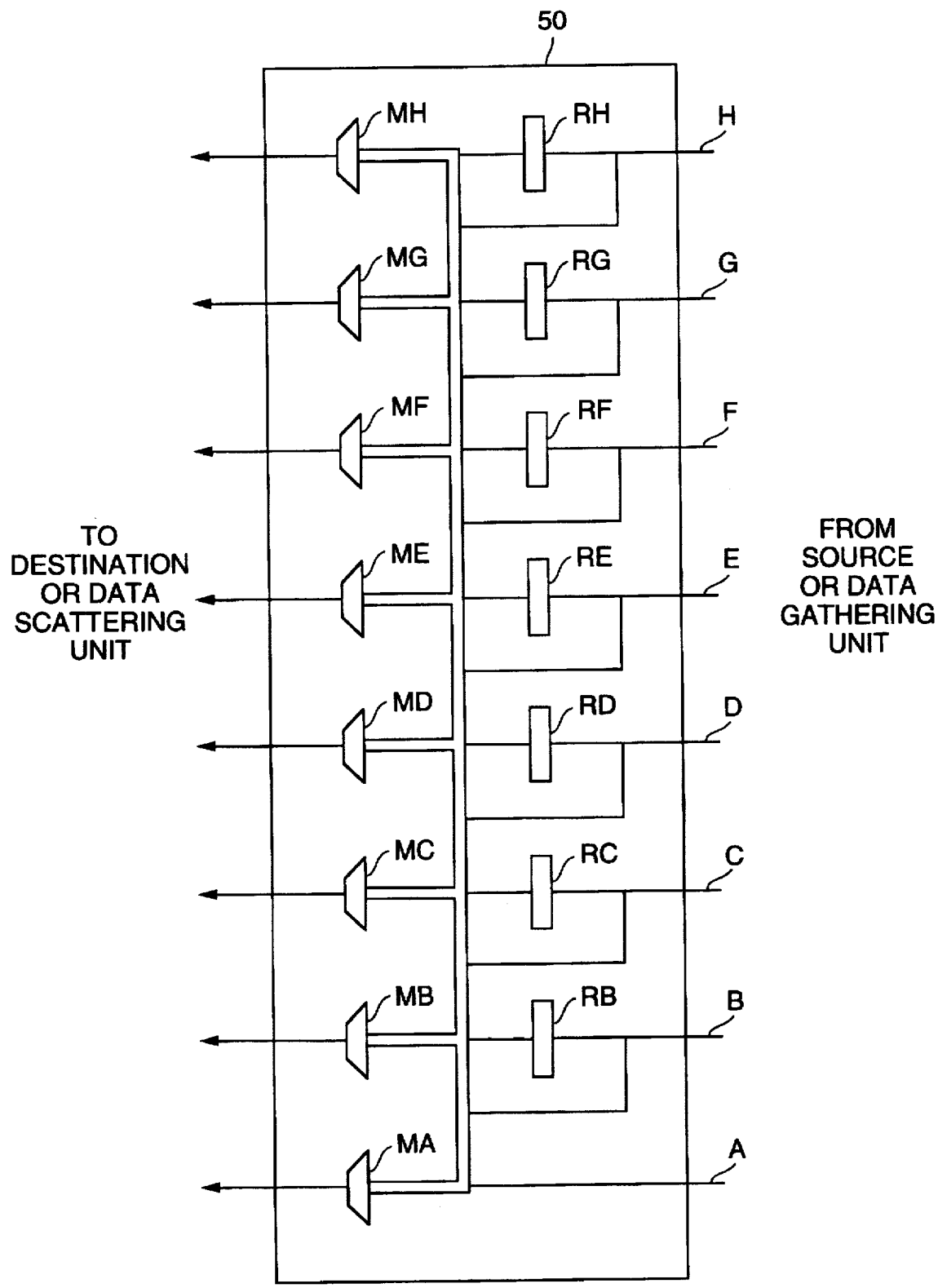
FIG. 5 illustrates an alternative embodiment of this invention designed for use with a 64-bit (8 byte) bus.

The structure of a logic cell suitable for aligning eight lanes of data is illustrated in FIG. 5. A byte gathering/scattering unit 50 contains multiplexers MA to ME and registers RB to RH. The input lines A to H receive bytes from a source memory (if unit 50 is functioning as a gathering unit) or from a byte gathering unit (if unit 50 is functioning as a byte scattering unit). The connections between the inputs, the registers and the multiplexers are described in Table D, wherein the control bits in the left hand column represent the control inputs of each of multiplexers MA to ME and the data in the other columns indicate the register or input line to which the inputs of each multiplexer are connected.

TABLE D

| Control Bits | Multiplexers | | | | | | | |
|---|---|---|---|---|---|---|---|---|
| | MA | MB | MC | MD | ME | MF | MG | MH |
| 000 | A | B | C | D | E | F | G | H |
| 001 | RH | A | B | C | D | E | F | G |
| 010 | RG | RH | A | B | C | D | E | F |
| 011 | RF | RG | RH | A | B | C | D | E |
| 100 | RE | RF | RG | RH | A | B | C | D |
| 101 | RD | RE | RF | RG | RH | A | B | C |
| 110 | RC | RD | RE | RF | RG | RH | A | B |
| 111 | RB | RC | RD | RE | RF | RG | RH | A |

Table E shows the mapping for the control bits to use unit 50 in the byte gathering or byte scattering mode. The 3-bit word in the lefthand column represents the least significant bits in the starting or destination address.

TABLE E

| LSB of Address | Byte Gathering | Byte Scattering |
|---|---|---|
| 000 | 000 | 000 |
| 001 | 111 | 001 |
| 010 | 110 | 010 |
| 011 | 101 | 011 |
| 100 | 100 | 100 |
| 101 | 011 | 101 |
| 110 | 010 | 110 |
| 111 | 001 | 111 |

In the general case, the data alignment logic cell is connected in a bus having N lanes. The cell includes N multiplexers and N−1 registers. Each multiplexer has N inputs and one output. Since there are N lanes and N−1 registers, there are a total of N+(N−1)=2N−1 sources of data to be delivered to the inputs of the multiplexers.

Figure 6:
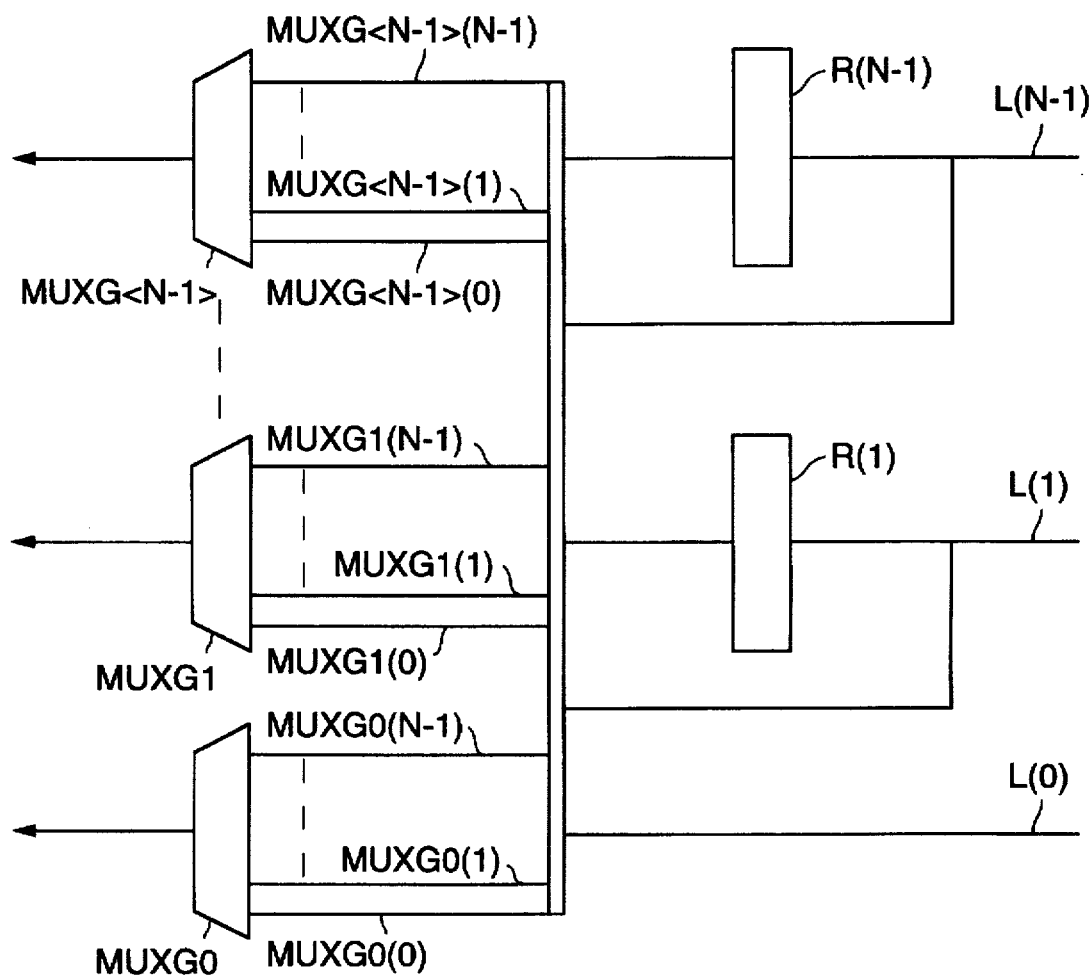
FIG. 6 illustrates the structure of data gathering or scattering unit usable with a bus having N lanes.

The connections to the inputs of the multiplexers can be described as follows. The N multiplexers are designated MOXG0, MUXG1, MUXG2 ... MUXG<N−1> and are associated with lanes designated L(0), L(1), L(2), ... L(N−1), respectively. Multiplexer MUXG0 has N inputs designated MUXG0(0), MUXG0(1) ... MUXG0(N−1); multiplexer MUXG1 has N inputs designated MUXG1(0), MUXG1(1) ... MUXG1(N−1); and multiplexer MUXG<N−1> has N inputs designated MUXG<N−1>(0), MUXG<N−1>(1)...MUXG<N−1>(N−1). The registers are designated R(1), R(2), R(3) ... R(N−1). This structure is illustrated in FIG. 6.

Table F sets forth the connections to each input of the multiplexers MUXG0 through MUXG<N−1>. This defines a unit of the kind illustrated in FIGS. 2A and 2B, which is inherently in the "scattering" mode, i.e., the unit performs as a data scattering unit if the control input is the two least significant bits of the destination address. Alternatively, the unit defined by Table F can be used as a data gathering unit by changing the control input to the 2's complement of the least significant bits of the source address, as shown in Table A. The 2's complement is obtained by inverting the bits and adding one, e.g., the 2's complement of 11 is 00+01=01.

TABLE F

| Multiplexer | INPUT | | | | |
|---|---|---|---|---|---|
| | N−1 | N−2 | --- | 1 | 0 |
| MUXG0 | R(1) | R(2) | --- | R(N−1) | L(0) |
| MUXG1 | R(2) | R(3) | --- | L(0) | L(1) |
| MUXG2 | R(3) | R(4) | --- | L(1) | L(2) |
| MUXG<N−2> | R(N−1) | L(0) | --- | L(N−3) | L(N−2) |
| MUXG<N−1> | L(0) | L(1) | --- | L(N−2) | L(N−1) |

The connections for a unit which inherently functions as a data gathering unit are shown in Table G. This unit functions as a data gathering unit if the control input is the two least significant bits of the source address. Again, the unit defined in Table G may be converted to a data scattering unit by changing the control input to the 2's complement of the least significant bits of the destination address.

TABLE G

| Multiplexer | INPUT | | | | |
|---|---|---|---|---|---|
| | N-1 | N-2 | --- | 1 | 0 |
| MUXG0 | R(N-1) | R(N-2) | --- | R(1) | L(0) |
| MUXG1 | L(0) | R(N-1) | --- | R(2) | L(1) |
| MUXG2 | L(1) | L(0) | --- | R(3) | L(2) |
| MUXG<N-2> | L(N-3) | L(N-4) | --- | R(N-1) | L(N-2) |
| MUXG<N-1> | L(N-2) | L(N-3) | --- | L(0) | L(N-1) |

The embodiments of this invention that have been described herein are intended to be illustrative and not limiting. Numerous alternative embodiments according to this invention will be apparent to those skilled in the art, and the broad principles of this invention are intended to cover all such alternative embodiments.

I claim:

1. A data alignment logic cell for transferring a block of data between a source memory and a destination memory over a multiple bit bus, said block being defined in said source memory by a starting source address and a number of data units to be transferred, said cell comprising:

a gathering unit for rearranging said block of data such that an initial data unit stored at said starting source address is shifted to a fixed lane of said bus and a scattering unit for rearranging said block of data such that said initial data unit is shifted from said fixed lane to a lane of said bus that corresponds to a starting destination address in said destination memory, an output of said gathering unit being connected to an input of said scattering unit, each of said units containing:

a plurality of registers;
   a plurality of multiplexers; and
   a control unit, an output of each of said registers being connected to an input of one or more of said multiplexers, said control unit delivering a binary code which selects an input of each of said multiplexers, said gathering unit receiving a data unit from a first lane of said bus and delivering said unit of data to said scattering unit, said scattering unit delivering said unit of data to a second lane of said bus, said gathering and scattering units thereby aligning said data unit on said bus in response to the codes provided by said control units.

2. The data alignment logic cell of claim 1 wherein said gathering unit has N inputs for connection to N lanes of said bus, said gathering unit receiving a first group of N data units at different times and delivering said first group of N data units simultaneously at N outputs of said gathering unit.

3. The data alignment logic cell of claim 2 wherein said scattering unit has N inputs connected to N outputs, respectively, of said gathering unit, said scattering unit receiving said first group of N data units simultaneously from said gathering unit and delivering said first group of N data units at different times at said outputs of said scattering unit.

4. The data alignment logic cell of claim 1 wherein each of said gathering and scattering units includes N inputs, N multiplexers and N-1 registers, a first input being connected to N multiplexers, a second input being connected to N-1 multiplexers, and an Nth input being connected to one multiplexer.

5. The data alignment logic cell of claim 4 wherein an output of a first register is connected to one of said multiplexers, an output of a second register is connected to two of said multiplexers and an output of an (N-1)th register is connected to N-1 of said multiplexers.

6. The data alignment logic cell of claim 5 wherein said first input is connected to none of said registers and the other ones of said N inputs are each connected to a different one of said N-1 registers.

7. The data alignment logic cell of claim 1 wherein said binary code provided by said control unit in said scattering unit comprises the least significant bits of said starting destination address and said binary code provided by said control unit in said gathering unit comprises the 2's complement of the least significant bits of said starting source address.

8. The data alignment logic cell of claim 1 wherein said binary code provided by said control unit in said gathering unit comprises the least significant bits of said starting source address and said binary code provided by said control unit in said scattering unit comprises the 2's complement of the least significant bits of said starting destination address.

9. A method of transferring a block of data from a source memory to a destination memory over a multiple bit bus, said block of data being defined by a number of data units and a starting source address in said source memory, said block of data to be transferred to a plurality of storage locations in said destination memory defined by a starting destination address, said bus having N data lanes, said method comprising:

gathering said data block such that a first data unit is certain to appear in a first data lane of said bus, a second data unit is certain to appear in a second data lane of said bus, and a third data unit is certain to appear in a third data lane of said bus, wherein said first data lane corresponds to said starting source address; and scattering said data block such that said first data unit is transferred to a first destination lane of said bus, said second data unit is transferred to a second destination lane of said bus, and said third data unit is transferred to a third destination lane of said bus, wherein said first destination lane corresponds to said starting destination address and said step of gathering occurs prior to said step of scattering.

10. The method of claim 9 wherein said step of gathering comprises temporarily storing a first group of M data units, M being less than N, such that a first group of N data units in said data block are lined up on said bus.

11. The method of claim 9 wherein said step of scattering comprises temporarily storing a first group of L data units, L being less than N, such that said first group of L data units in said data block are lined up on said bus.

* * * * *

UNITED STATES PATENT AND TRADEMARK OFFICE
CERTIFICATE OF CORRECTION

PATENT NO. : 5,687,328
DATED : November 11, 1997
INVENTOR(S) : Lee, Johnny Chuang-Li It is certified that error appears in the above-identified patent and that said Letters Patent is hereby corrected as shown below:

Column 5, lines 37 and 46, delete "ME" and insert --MH--.

Signed and Sealed this

Eighteenth Day of August, 1998

Attest:

BRUCE LEHMAN

*Attesting Officer*     *Commissioner of Patents and Trademarks*